US010051358B2

United States Patent
Yamkovoy

(10) Patent No.: US 10,051,358 B2
(45) Date of Patent: Aug. 14, 2018

(54) MULTI-PURPOSE AVIATION HEADSETS

(71) Applicant: Bose Corporation, Framingham, MA (US)

(72) Inventor: Paul G. Yamkovoy, Acton, MA (US)

(73) Assignee: Bose Corporation, Framingham, MA (US)

(*) Notice: Subject to any disclaimer, the term of this patent is extended or adjusted under 35 U.S.C. 154(b) by 49 days.

(21) Appl. No.: 15/238,310

(22) Filed: Aug. 16, 2016

(65) Prior Publication Data

US 2018/0054667 A1    Feb. 22, 2018

(51) Int. Cl.
| | |
|---|---|
| *G10K 11/16* | (2006.01) |
| *H03B 29/00* | (2006.01) |
| *H04R 1/10* | (2006.01) |
| *H04W 4/00* | (2018.01) |
| *H04R 1/08* | (2006.01) |
| *H04W 4/80* | (2018.01) |

(52) U.S. Cl.
CPC ............ *H04R 1/1041* (2013.01); *H04R 1/08* (2013.01); *H04R 1/1008* (2013.01); *H04R 1/1025* (2013.01); *H04W 4/008* (2013.01); *H04W 4/80* (2018.02); *H04R 2420/05* (2013.01); *H04R 2420/07* (2013.01); *H04R 2420/09* (2013.01); *H04R 2460/01* (2013.01)

(58) Field of Classification Search
CPC ...... H04R 1/1041; H04R 1/08; H04R 1/1008; H04R 1/1025; H04R 2420/05; H04R 2420/07; H04R 2420/09; H04R 2460/01; H04W 4/008
See application file for complete search history.

(56) References Cited

U.S. PATENT DOCUMENTS

| | | | |
|---|---|---|---|
| 9,049,513 B2 | 6/2015 | Yamkovoy | |
| 2002/0087319 A1* | 7/2002 | Stephenson | G10L 15/26 704/270 |
| 2011/0012667 A1* | 1/2011 | Yamkovoy | H03K 5/1254 327/434 |
| 2012/0014530 A1* | 1/2012 | Yamkovoy | H04M 1/6066 381/58 |
| 2012/0308048 A1* | 12/2012 | Yamkovoy | H04R 1/1091 381/111 |
| 2013/0163775 A1* | 6/2013 | Yamkovoy | G10K 11/1782 381/71.6 |
| 2014/0010389 A1* | 1/2014 | Slocum | H04R 1/1066 381/309 |
| 2014/0301562 A1* | 10/2014 | Tu | H04R 3/00 381/74 |

(Continued)

OTHER PUBLICATIONS

Bose® A20® Aviation Headset, Owner's Guide; Bose Corporation, 2014; 40 pages.

*Primary Examiner* — Regina N Holder
(74) *Attorney, Agent, or Firm* — Fish & Richardson P.C.

(57) ABSTRACT

The technology described in this document can be embodied in a portable apparatus that includes three connection ports. The first connection port is for connecting the portable apparatus to one or more acoustic transducers, the second connection port is for receiving a connection to a microphone, and the third connection port is for receiving a conductor that connects the portable apparatus to a communication module of an aircraft. The portable apparatus also includes circuitry for interconnecting the first, second, and third connection ports.

28 Claims, 7 Drawing Sheets

(56) References Cited

U.S. PATENT DOCUMENTS

2015/0003623 A1\* 1/2015 Rasmussen .......... G10K 11/002
 381/71.6
2017/0324493 A1\* 11/2017 Christian ............... H04H 60/05

\* cited by examiner

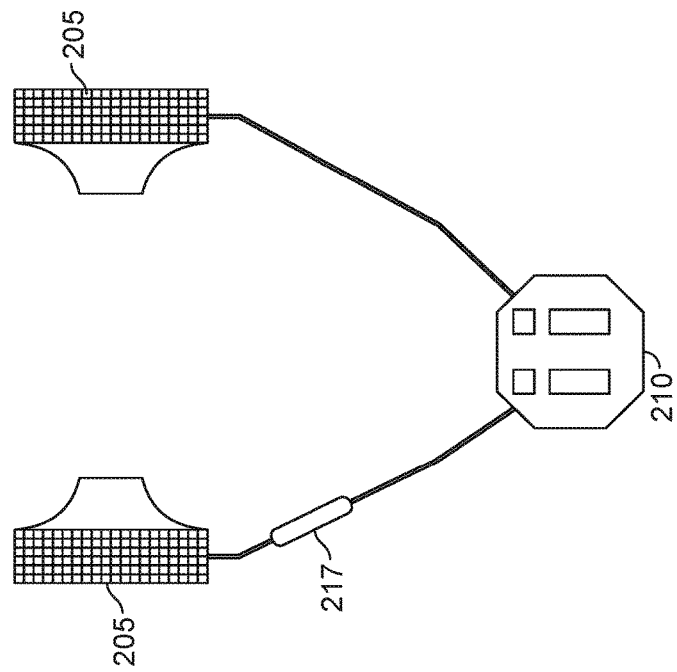
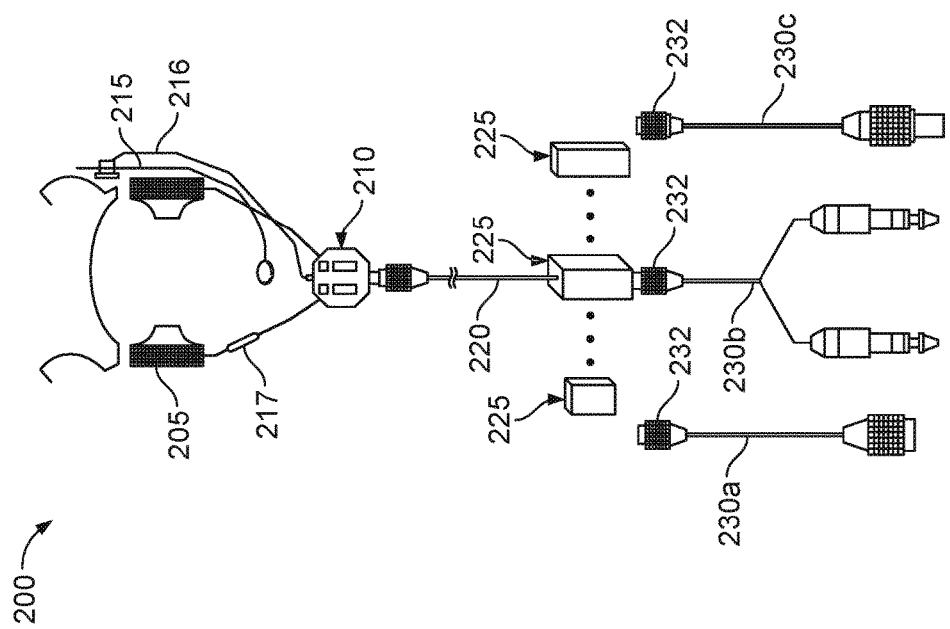

MULTI-PURPOSE AVIATION HEADSETS

TECHNICAL FIELD

This disclosure generally relates to aviation headsets.

BACKGROUND

Aviation headsets are used by pilots in commercial and general aviation to communicate over aircraft intercom and radio systems. Such headsets may also have wireless communication capabilities that allow two pilots to communicate with each other directly.

SUMMARY

In one aspect, this document features a portable apparatus that includes three connection ports. The first connection port is for connecting the portable apparatus to one or more acoustic transducers, the second connection port is for receiving a connection to a microphone, and the third connection port is for receiving a conductor that connects the portable apparatus to a communication module of an aircraft. The portable apparatus also includes circuitry for interconnecting the first, second, and third connection ports.

In another aspect, this document features an apparatus that includes one or more acoustic transducers and a connection module. The connection module is connected to the one or more acoustic transducers, and includes a microphone port for detachably receiving a connector to a microphone. The connection module also includes an external connection port for detachably receiving a conductor providing a connection to a communication module of an aircraft.

In another aspect, this document features an apparatus that includes a connection module and an electrical connector. The connection module includes a first connection port for connecting the apparatus and one or more acoustic transducers, a second connection port for detachably receiving a connector to a microphone, and a third connection port for connecting the apparatus to a communication module of an aircraft. The electrical connector is configured to be detachably attached to the connection module at the third connection port, and includes an in-line energy storage and selection module and a multi-pin port. The in-line energy storage and selection module is configured to provide at least a portion of operating power to the connection module, and the multi-pin port is configured to receive an adaptor that connects to a cable selectable from multiple cables of different types. The cable couples the electrical connector to the communication module of the aircraft.

The above aspects can include one or more of the following features. The conductor may connect the portable apparatus to an energy storage and selection module to which the communication module of the aircraft is connected. The first connection port can be configured to receive a wired connection to the one or more acoustic transducers in a detachable configuration. The one or more acoustic transducers can be disposed in a headset or a set of earphones. The microphone can be a boom microphone that is detachably attached to a headset or a set of earphones and detachably attached to the portable apparatus. The apparatus can include a noise reduction engine configured to process signals output on the first connection port. The apparatus can include a wireless transceiver configured to provide a wireless connection between the portable apparatus and an external wireless-enabled device. The one or more acoustic transducers can be disposed in the wireless-enabled device.

The wireless transceiver engine can include a Bluetooth® module. The apparatus can be configured to be powered by an external power source and/or an internal power source disposed within the apparatus. The apparatus can include a fourth connection port for charging the internal power source from an external source. The apparatus can include circuitry to disconnect from the internal power source upon detecting that an external power source is available to power the apparatus. The apparatus can include one or more processing devices configured to determine an operating state based on detecting which of the first, second, and third connection ports is being used. The one or more processors can be configured to determine that the second connection port is disconnected, and responsive to determining that the second connection port is disconnected, enable the first connection port to receive input signals from an in-line microphone connected to the one or more acoustic transducer.

The multiple cables can include a group consisting of a single-prong intercom cable, a multi-prong intercom cable, and a LEMO/Redel intercom cable. The in-line energy storage and selection module can include a battery bank. The in-line energy storage and selection module can include circuitry to disconnect the battery bank upon detecting that an external power source is available to power the apparatus. The in-line energy storage and selection module can include a power multiplexer that selects, as a power source for the apparatus, one of: the battery bank or an external power source.

Various implementations described herein may provide one or more of the following advantages.

In some implementations, the technology described herein provides a portable apparatus that can be removably connected to an aircraft intercom system. By providing separate connection ports for a headset and an aviation microphone (e.g., a boom microphone) on such a portable apparatus, the technology may allow for decoupling of the aviation microphone from the headset during non-aviation uses. This in turn can improve usability of the headset for personal, non-aviation purposes. In some cases, certain aviation-specific circuitry such as advanced noise-cancellation can be implemented within the portable apparatus, thereby allowing for small form factor headsets to be used for aviation purposes. By having a port that removably receives a connection to a communication module of an aircraft, a headset system may be made compatible with various types of cables, and by extension, various types of aircraft-communication modules.

Two or more of the features described in this disclosure, including those described in this summary section, may be combined to form implementations not specifically described herein.

The details of one or more implementations are set forth in the accompanying drawings and the description below. Other features, objects, and advantages will be apparent from the description and drawings, and from the claims.

DESCRIPTION OF THE DRAWINGS

FIG. 2A shows an example implementation wherein a headset and microphone are connected to a portable apparatus for use in an aircraft.

FIG. 2B shows the headset and portable apparatus from FIG. 2A as configured for a non-aviation use.

DETAILED DESCRIPTION

Aviation headsets are used by pilots in both general aviation and commercial aviation. Such headsets can be connected to aircraft communication systems, for example to communicate with air-traffic control (ATC) or with other pilots. The headsets can also be used as a public addressing system, for example, for the pilots to speak with passengers on board the aircraft. The aircraft communication systems typically include an analog communication system such as an intercom. In some cases, such an intercom system can be configured to communicate over the very-high-frequency (VHF) bands (e.g., 18 MHz to 136.975 MHz) wherein each channel is separated from the adjacent ones by a band of pre-specified width (e.g., 8.33 kHz in Europe, 25 kHz elsewhere). An analog modulation technique such as amplitude modulation (AM) can be used for the communications, and the conversations may be performed in simplex mode. In some cases, for example, for trans-oceanic flights, other frequency bands such as high-frequency (HF) bands can be used for satellite communications. Aviation headsets may be used, for example, by pilots and air-traffic controllers to communicate with one another.

Figure 1:
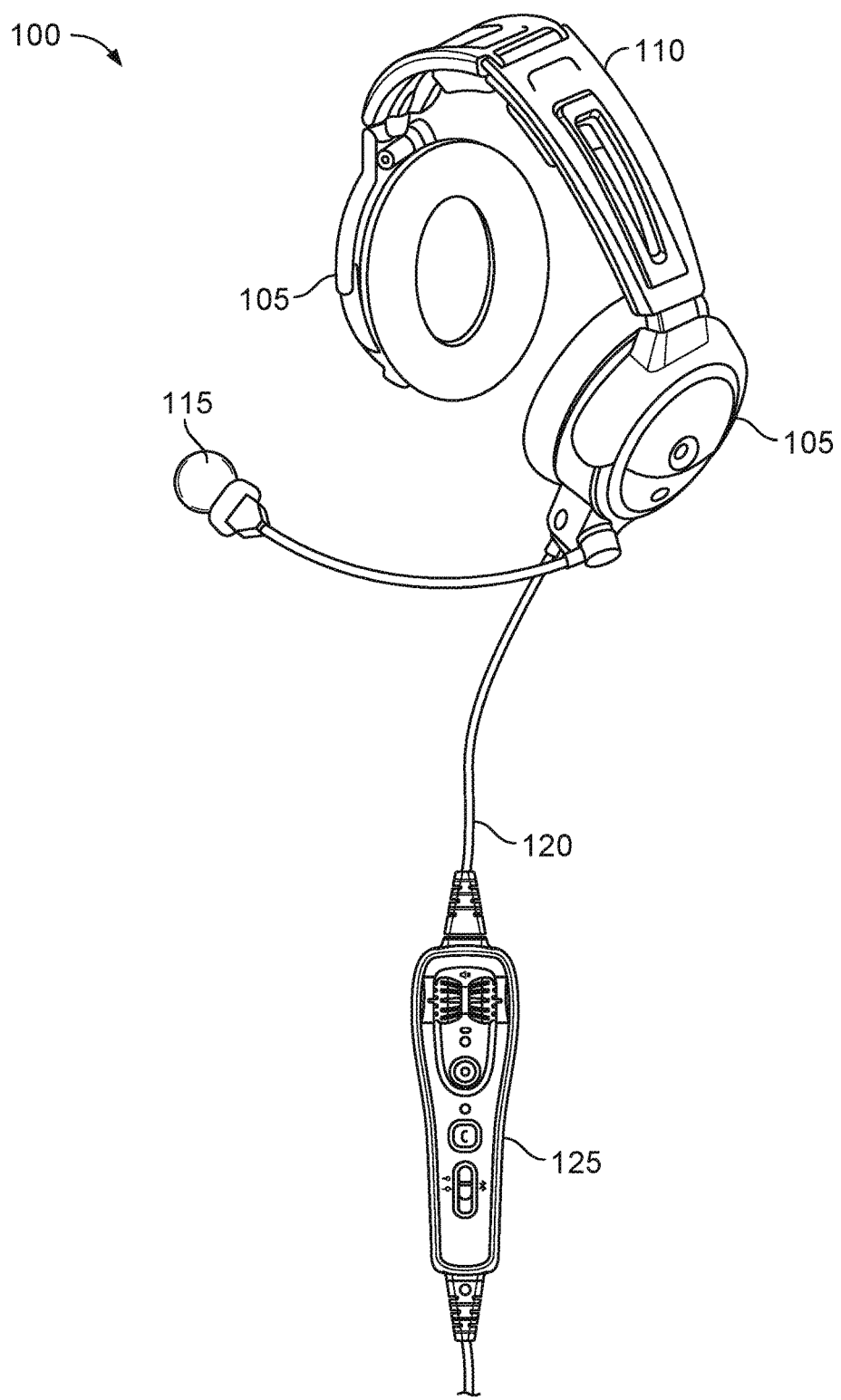
FIG. 1 is an example implementation of an aviation headset.

An example of an aviation headset 100 is shown in FIG. 1. The headset 100 includes an ear-cup 105 on each side, which fits on, around, over the ear, or in-ear of a user. Each of the ear-cups 105 houses acoustic transducers or speakers. The headset 100 also includes an over-the-head bridge 110 for connecting the two ear-cups 105. In some implementations, a microphone 115 (e.g., a boom microphone) may be physically connected to one of the ear-cups 105. The headset 100 can be connected to the aircraft intercom system using the connecting cable 120, which may also include a control module 125 that includes one or more controls and/or batteries for the headset 100. The analog signals to and from the aircraft intercom system are transmitted through the wired connection provided by the connecting cable 120. While the example in FIG. 1 illustrates an aviation headset that includes around-ear ear-cups, aviation headsets having other form-factors, including those having in-ear headphones or on-ear headphones, may also be compatible with the technology described herein. Also, the term headset, as used in this document, includes various types of acoustic devices that may be used for aviation purposes, including, for example, earphones and earbuds.

In some cases, it may be desirable to use aviation headsets for non-aviation purposes such as personal use. For example, a pilot may want to use an aviation headset for listening to music or making phone calls when not flying, or flying as a passenger, or when using the headset for noise reduction while in other noisy environments. However, some pilots may find regular aviation headsets (e.g., ones fitted with a boom microphone and long intercom connecting down-cable) to be too bulky or unwieldy for personal use. The technology described herein provides for a portable apparatus that includes separate ports for removably receiving headsets and microphones. The apparatus also provides one or more connection ports for receiving a conductor that connects the portable apparatus to a communication module (e.g., intercom system) of an aircraft. Using such a portable apparatus, an aviation microphone (e.g., a boom microphone) may be decoupled from the headset (e.g., during personal use of the headset), thereby potentially making the same headset conducive for both aviation and non-aviation uses. In some implementations, one or more modules associated with the headset (e.g., noise cancellation circuitry, wireless transceiver modules, or sidetone generator modules) may be disposed on the portable apparatus, thereby reducing the form-factor of the headsets, and potentially increasing the appeal of such headsets for personal use. In addition, by having a port configured to removably receive a connection to a communication module of an aircraft, the portable apparatus may be made compatible with various types of cables, and by extension, various types of aircraft-communication modules.

FIG. 2A shows an example headset system 200 wherein a headset 205 and a microphone 215 are connected to a portable apparatus 210. The headset system 200 is configured for use in an aircraft. For example, the portable apparatus 210 can include a connection port for removably receiving various types of cables (e.g., intercom cables 230a, 230b, or 230c (230, in general)) for connecting the portable apparatus 210 to communication modules (e.g., intercom systems) of aircrafts. In some implementations, the connection port can be configured to receive a universal connector module 232 or adaptor that is compatible with the various types of cables 230. In some implementations, the ability to receive different types of cables 230 may allow for compatibility with different types of aircraft communication modules and reduce the need for different headsets with hardwired cables.

FIG. 2B shows the headset and portable apparatus from FIG. 2A as configured for a non-aviation use. In the particular configuration of FIG. 2B, the microphone 215 (which in FIG. 2A is shown to be connected to the portable apparatus 210 via the connector 216) is removed, which reduces the overall form factor of the headset system, and makes the headset more amenable to non-aviation and personal uses. In some implementations, a connector that connects the headset 205 to the portable apparatus 210 can include an in-line microphone 217 that may be used (e.g., for making a phone-call using the headset) when the microphone 215 is not connected to the portable apparatus 210.

In some implementations, the portable apparatus 210 can include one or more processing devices (e.g., one or more microprocessors or microcontrollers) that can be configured to infer a state of the headset system 200 based on, for example, accessories that are connected to the portable apparatus 210. For example, if one or more of the microphone 215, energy storage and selection module 225, and/or intercom cable 230 are connected to respective ports on the portable apparatus 210, the one or more processing devices can be configured to infer that the headset system 200 is being used for piloting or aviation purposes. In contrast, when one or more of the microphone 215, energy storage and selection module 225, and/or intercom cable 230 are not connected, the one or more processing devices can be configured to infer that the headset is being used for a personal or non-aviation purpose. In such cases, the one or more processing devices can be configured to enable the in-line microphone 217 for use in the non-aviation mode.

In some implementations, the portable apparatus 210 can include a connection port for removably receiving a cable 220 that connects the portable apparatus to an energy storage and selection module 225 such as a battery pack. As shown in FIG. 2A, the portable apparatus 210 can be made compatible with various types of energy storage modules 225, such as, a dual battery pack, a single battery pack, a lithium ion rechargeable pack, or a multi-chemistry battery pack. In some implementations, the portable apparatus 210 can include an internal power source (e.g., a battery module) within the housing of the portable apparatus 210. If the power source disposed within the portable apparatus 210 is a rechargeable source, the portable apparatus 210 can also include one or more additional ports (e.g., a universal serial bus (USB) port or a micro-USB port) for charging the rechargeable source. Connection port 232 may also be utilized for charging said rechargeable source. In some implementations, the cables 230 for connecting the portable apparatus 210 to the aircraft communication modules may be connected directly to the portable apparatus 210 without an intervening energy storage and selection module 225. In some implementations, the energy storage and selection module 225 can function as a power source for charging a rechargeable source disposed within the portable apparatus 210. For example, one or more processing devices of the portable apparatus 210 can be configured to monitor power levels of the rechargeable source and/or an energy storage and selection module (e.g., a battery pack) connected to the portable apparatus 210. The one or more processing devices can also be configured to generate control signals for routing any excess power from the energy storage and selection module 225 to charge the rechargeable source. In some implementations, the portable apparatus 210 may also be powered by a power source on the aircraft, for example, through a conductor within a cable 230 connecting the portable apparatus 210 to an aircraft communication module.

In some implementations, the portable apparatus 210 may be configured to be powered from more than one power source depending on a mode of operation. For example, when the headset system 200 is being used in an aviation mode (e.g., as shown in FIG. 2A), the portable apparatus 210 may be powered by an energy storage and selection module 225, or a power source located on the aircraft (e.g., via cable 230). When the same headset system 200 is used in a non-aviation mode (e.g., as shown in FIG. 2B), the portable apparatus may be powered by a power source (e.g., a rechargeable power source) located within the portable apparatus 210. In some implementations, when a power source located on the aircraft detected, the headset automatically diverts its power consumption to such source, preserving the charge of its battery(s).

Figure 4:
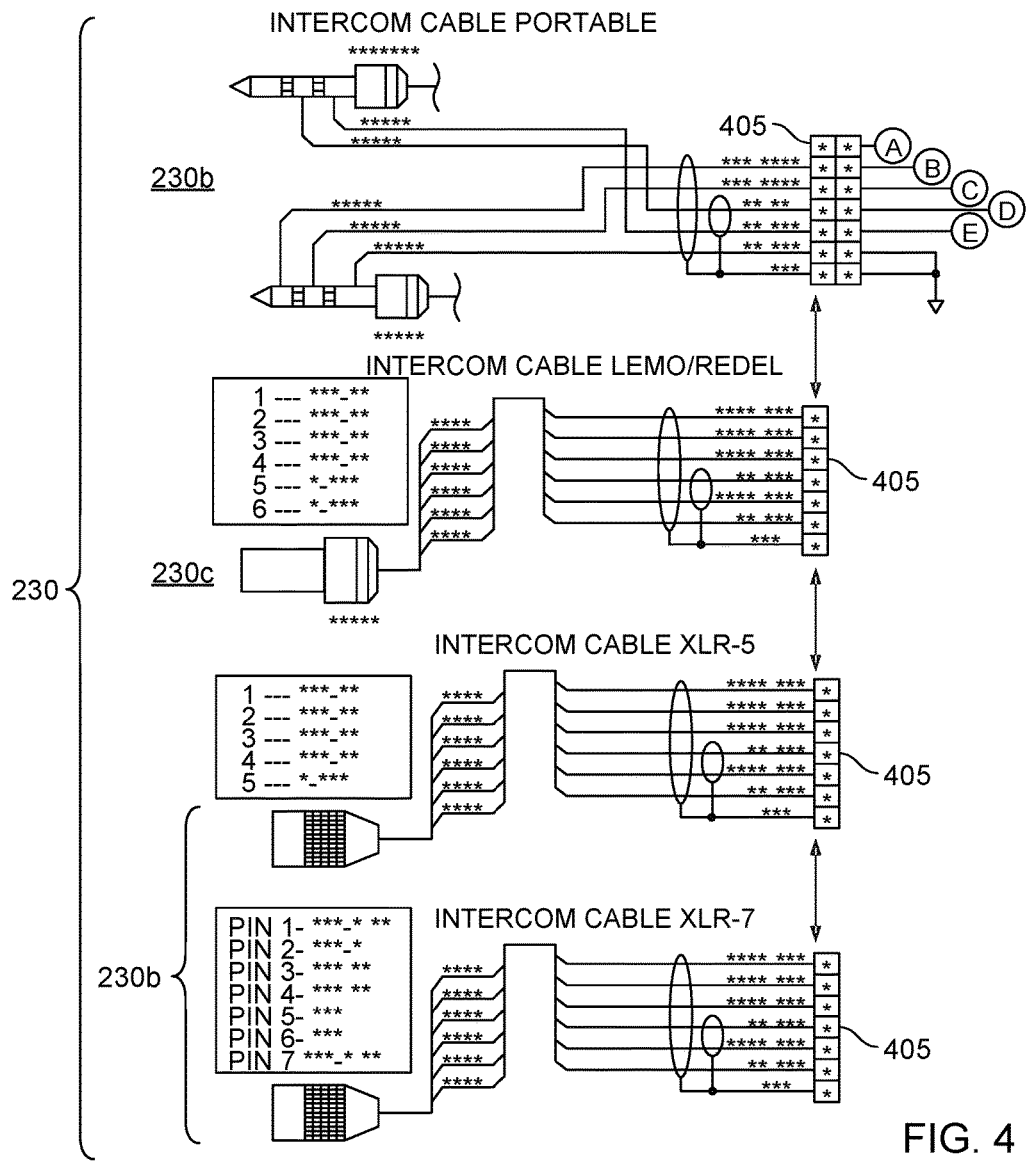
FIG. 4 shows an example circuit diagram of a connector module usable for connecting the portable apparatus to an aircraft communication system.
Figure 4:
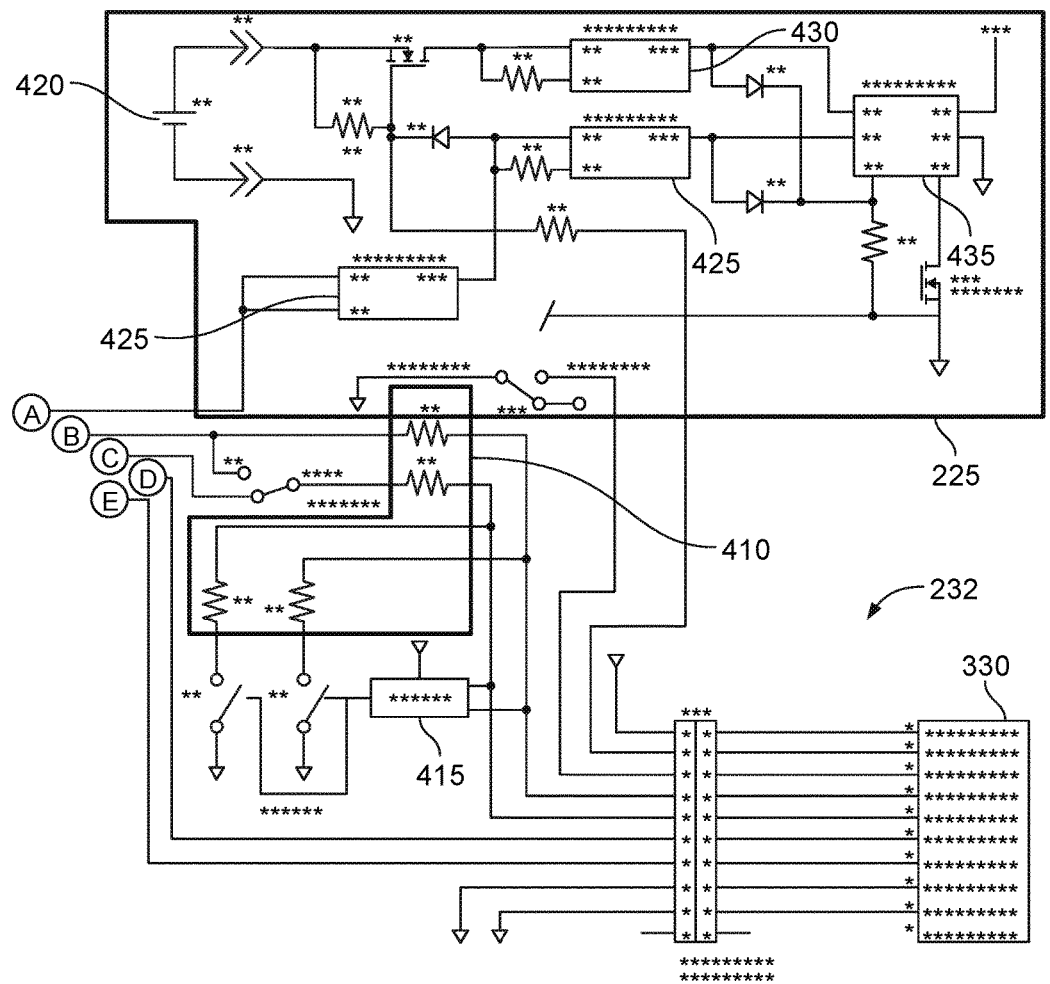

The cables 230 used for connecting the portable apparatus 210 to aircraft communication modules can be of different types. In some implementations, the cable 230 can be an intercom cable XLR5 or XLR7 (represented in FIG. 2A as the cable 230a). In some implementations, the cable 230 can be a multi-pronged cable 230b such as a multi-pronged intercom cable. In some implementations, the cable 230 can be a LEMO/Redel intercom cable (represented in FIG. 2A as the cable 230c). Example circuit diagrams associated with these cables are illustrated in FIG. 4. The above examples are used for illustrative purposes, and other types of cables may also be used without deviating from the scope of this disclosure.

Figure 3:
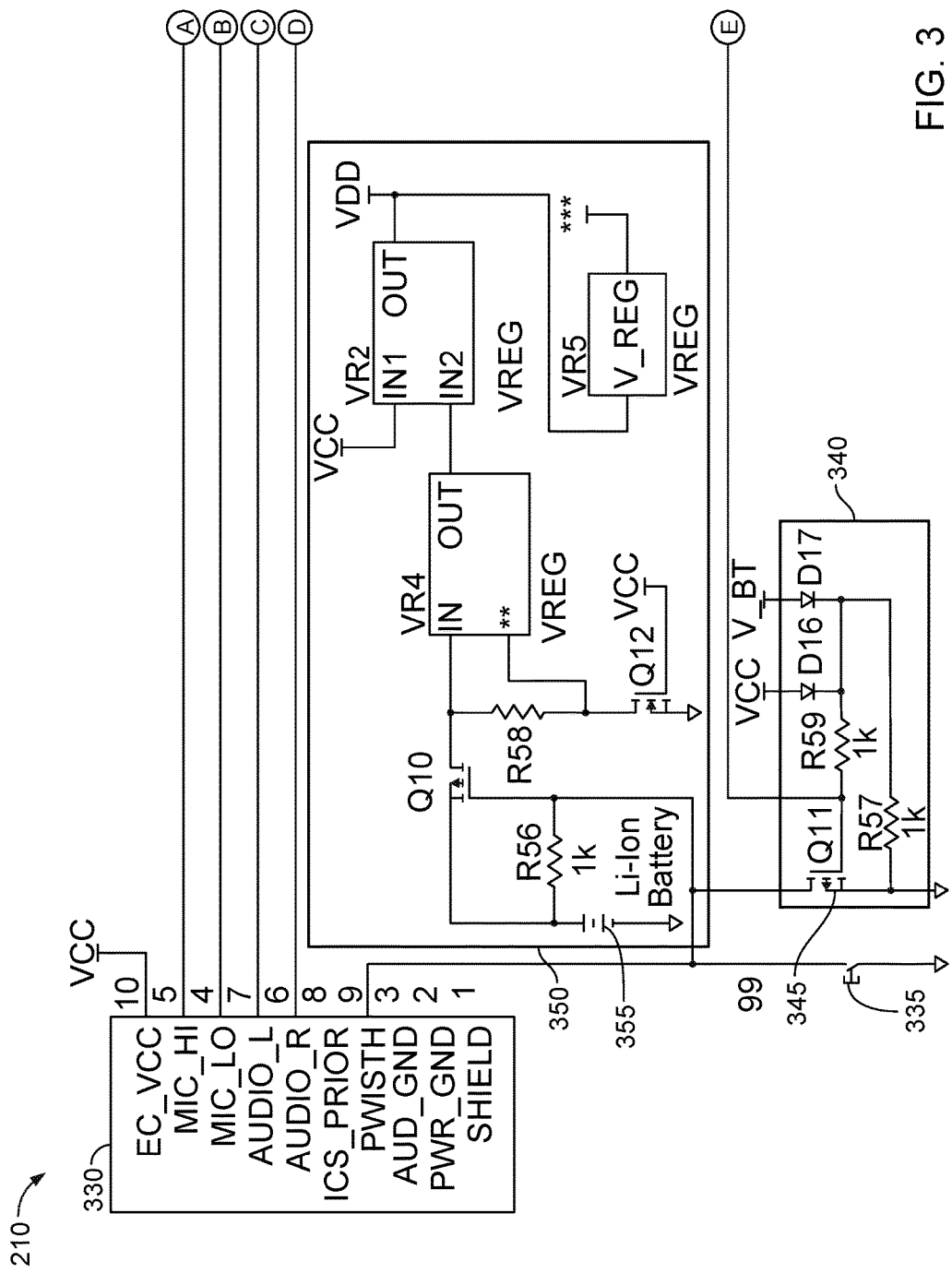
FIG. 3 shows an example circuit diagram of the portable apparatus of FIG. 2A.
Figure 3:
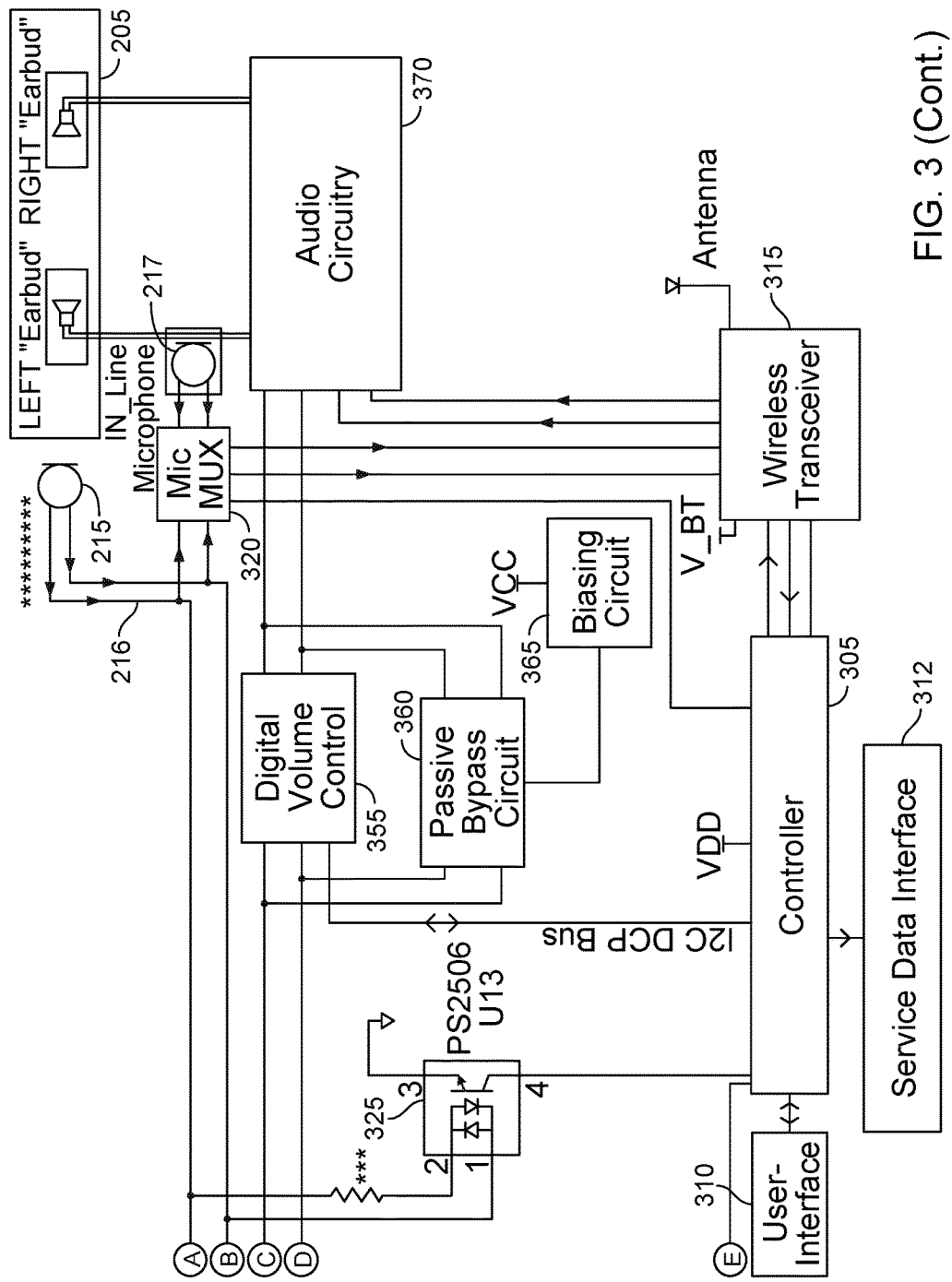

FIG. 3 shows an example circuit diagram of the portable apparatus 210. As shown in FIG. 3, the portable apparatus 210 includes a controller 305 that controls various operations of the portable apparatus 210. The controller 305 can include memory and one or more processing devices, and can be configured to manage the various interconnected circuitry and modules of the portable apparatus 210. In some implementations, operations of the controller 305 may be adjusted by a user interface 310. In some implementations, the user interface 310 can include hard-wired controls such as buttons, switches etc. In some implementations, the user-interface 310 can include one or more input/output devices that can be used as indicators of operational status of the portable device 210. For example, the user-interface 310 can include one or more light-emitting diodes (LEDs) or a display device (e.g., a liquid crystal display (LCD) or LED screen) for displaying various operational information associated with the portable device 210. In some implementations, the user-interface 310 may also be provided on a separate device. For example, the user-interface 310 may be displayed via an application executing on a remote device (e.g., a smartphone or a tablet computer) that can communicate (e.g., over a wireless link) with the portable apparatus 310.

In some implementations, the controller 305 may communicate with a service data interface 312, which may be usable by personnel servicing the headset. The service data interface 312 can include, for example, one or more standard interfaces (e.g., USB, micro-USB etc.) for retrieving data and/or specific information related to the corresponding headset (e.g., serial number, date of production, number of hours in service, fault reports, diagnostics, configuration and settings data, etc.). The data and information may be accumulated and stored on a storage device, e.g., by the controller 305, and accessed via the service data interface 312. In some implementations, the data and/or information may be stored in non-volatile memory so that the stored data/information is not lost when power supply to the headset is unavailable.

In some implementations, the portable apparatus 210 can include a wireless transceiver 315 that can communicate with other wireless-enabled devices. For example, the wireless transceiver 315 can be a Bluetooth® engine configured to communicate with other Bluetooth® devices such as smartphones, tablet computers, media players, or another portable device 210. The wireless transceiver may also be configured to operate based on other wireless communication protocols including, for example, Bluetooth® Low Energy (BLE), Near Field Communications (NFC), IEEE 802.11, or other local area network (LAN) or personal area network (PAN) protocols. While operating in an aviation mode, the wireless transceiver may be used, for example, to communicate with a portable device (or other wireless-enabled headset) used by a co-pilot. In a non-aviation or personal mode, the wireless transceiver may be used, for example, to stream audio from a connected phone or other media playing device. The controller 305 can be configured to communicate with the wireless transceiver 315 over a bidirectional bus.

In some implementations, the portable apparatus 210 includes a microphone multiplexer circuit 320 which may be used to select between an external microphone 215 (e.g., a boom microphone) and an in-line microphone 217 provided as a portion of the headset 205. The microphone multiplexer circuit 320 can be controlled by the controller 305 based on, for example, an input signal received from a bias detection circuit 325. For example, the bias detection circuit 325 can be configured to detect whether an external microphone 215 is connected to the portable apparatus 210, and provide an input signal indicative of the same to the controller 305. The controller 305 in turn may accordingly generate a control signal for the microphone multiplexer circuit 320 to select either the external microphone 215 or the in-line microphone 217. For example, if no external microphone 215 is detected by the bias detection circuit 325, the controller can generate a control signal instructing the microphone multiplexer circuit 320 to route signals detected by the in-line microphone 217 to the wireless transceiver 315.

In some implementations, the portable apparatus 210 includes a connection port 330 configured to receive a cable (e.g., the cable 220 illustrated in FIG. 2A) that connects the portable apparatus 210 to a communication module of an aircraft either directly or via an energy storage and selection module 225. The connection port 330 can be a 10 pin connection port as illustrated in the example of FIG. 3. Connection ports with more or fewer number of pins may also be used. In some implementations, one of the pins of the connection port 330 can be electrically connected to a power switch 335 that is used to activate the portable apparatus 210. Activation of the power switch 335 can cause power-up circuitry 340 to draw power from an internal or external power source to supply power to one or more modules of the portable apparatus. For example, upon activation of the power switch 335, the transistor 345 of the power-up circuitry 340 is activated to latch up to route power from internal or external power sources to various modules of the portable apparatus, including, for example, the controller 305 and the wireless transceiver 315. In some implementations, the portable apparatus 210 can include an internal power source 350. The internal power source 350 can include a rechargeable battery pack 355 (e.g., a bank of lithium-ion batteries) that may be used as a power source for one or more modules of the portable apparatus 210.

The portable apparatus 210 can also include various other modules and circuits, for example, in accordance with desired functionalities of the portable apparatus. For example, the portable apparatus 210 can include a digital volume control module 355, a passive bypass circuit 360 for bypassing the digital volume control module 355, and a biasing circuit 365 for activating the passive bypass circuit 360. The passive bypass circuit can be configured to maintain the communication capabilities of the headset in certain situations, for example, where no energy source is available. In some implementations, the portable apparatus 210 can include audio circuitry 370 for implementing, for example, various types of audio processing such as active noise reduction (ANR) and equalization. The audio circuitry 370 can also provide interconnections between the various modules and connection ports of the portable apparatus 210. For example, the audio circuitry 370 can include a headset connection port for detachably receiving a wired connection to a headset 205 that includes one or more acoustic transducers, and can provide interconnections between the headset connection port and other connection ports (e.g., the connection port for receiving the external microphone 215 and the connection port for receiving a connection to a communication module of an aircraft) of the portable apparatus 210.

FIG. 4 shows an example circuit diagram of a connector module 232 usable for connecting the portable apparatus to an aircraft communication system. The connector module 232 can be used for connecting a portable apparatus 210 either directly to an aircraft communication module, or via an energy storage and selection module 225. The connector module 232 is configured to mate with a connection port 330 on the portable apparatus 210 (or in some cases, an energy storage and selection module 225), and receives, on the opposite end, one of various types of cables 230 that connect with an aircraft communication module. The connector module 232 can be configured to receive a cable 230 via a 7-pin connector 405 as shown in the example of FIG. 4, or another connector with more or fewer number of pins.

The cables 230 can be of different types. In some implementations, the cable 230 can be a general aviation intercom cable 230b (with a multi-pronged connector) that does not supply power. Accordingly, in the example of FIG. 4, there is no connection on the first pin of the connector 405. In some implementations, the cable 230 can be an intercom cable that supplies power. Examples of such cables include a LEMO/Redel intercom cable 230c and an XLR5 or XLR7 cable 230a. Such powered cables can be connected to the connector module 232 via the first pin of the connector 405.

In some implementations, the connector module 232 includes attenuator circuitry 410 that equalizes sensitivity and provides impedance matching. The connector module 232 can also include an equalizer 415 that adjusts sensitivity, for example, to comply with regulations promulgated by a governing authority such as the Federal Aviation Administration (FAA). In some implementations, the equalizer 415 can be configured such that the headset can be operated in passive or active modes. For example, a governing authority such as the FAA may require headsets to be within a specific range of input impedances to comply with regulations. The requirements may be different for passive and active headsets. For example, the input impedance for passive headsets may be low (e.g., ranging between 150-1200 ohm). In contrast, active headsets may have high input impedance due to the nature of the electronic circuits involved and low battery consumption requirements. In some implementations, the equalizer 415 can be used for equalizing the input impedance such that the headset can comply with FAA regulations both in active and passive modes.

In some implementations, the connector module is coupled to an energy storage and selection module 225. In some implementations, the energy storage and selection module 225 can include an internal power source such as a bank of batteries 420 that can supply power to a portable apparatus 210 if no power from any external source is received, for example, through the first pin of the connector 405. On the other hand, if external power is available, circuitry in the energy storage and selection module 225 can be used to cut off the power supplied from the bank of batteries 420, and the portable apparatus can be powered from the external power source. For example, the energy storage and selection module 225 can include a step-down converter 425 (e.g., a buck converter) that steps down the voltage of the received power (e.g., from 8 to 32V to 4V). The power supplied by the bank of batteries 420 can be shut-off, for example, because the stepped down voltage is higher than the supply voltage available from the bank of batteries 420 (e.g., 1.8V-3.0V), thus preventing the battery from supplying power in the presence of the stepped down voltage. This is achieved by raising the voltage of the gate of transistor Q8 to or above the voltage of its source, resulting in turning Q8 off. The energy storage and selection module can also include an additional step-down converter 425 for further reducing the voltage from an external source to the level required for driving the portable apparatus 210. The energy storage and selection module 225 can also include a step-up converter (e.g., a boost converter) 430 to increase the voltage supplied by the bank of batteries 420 to the level required for driving the portable apparatus 210. In some implementations, the energy storage and selection module 225 can also include a power multiplexer 435 that can be configured to sense power supplied from both sources (external source and or bank of batteries 420) and select the source that is stronger. For example, if the supply from the bank of batteries 420 is shut-off, the power supplied from the external source is stronger and the power multiplexer 435 selects the corresponding line to provide power to the portable apparatus 210. On the other hand, if an external source is not present, the power supplied from the bank of batteries 420 is stronger and the power multiplexer selects the corresponding line to provide power to the portable apparatus 210. Such power multiplexing is described in additional detail in U.S. Pat. No. 9,049,513, the entire content of which is incorporated herein by reference.

Figure 5:
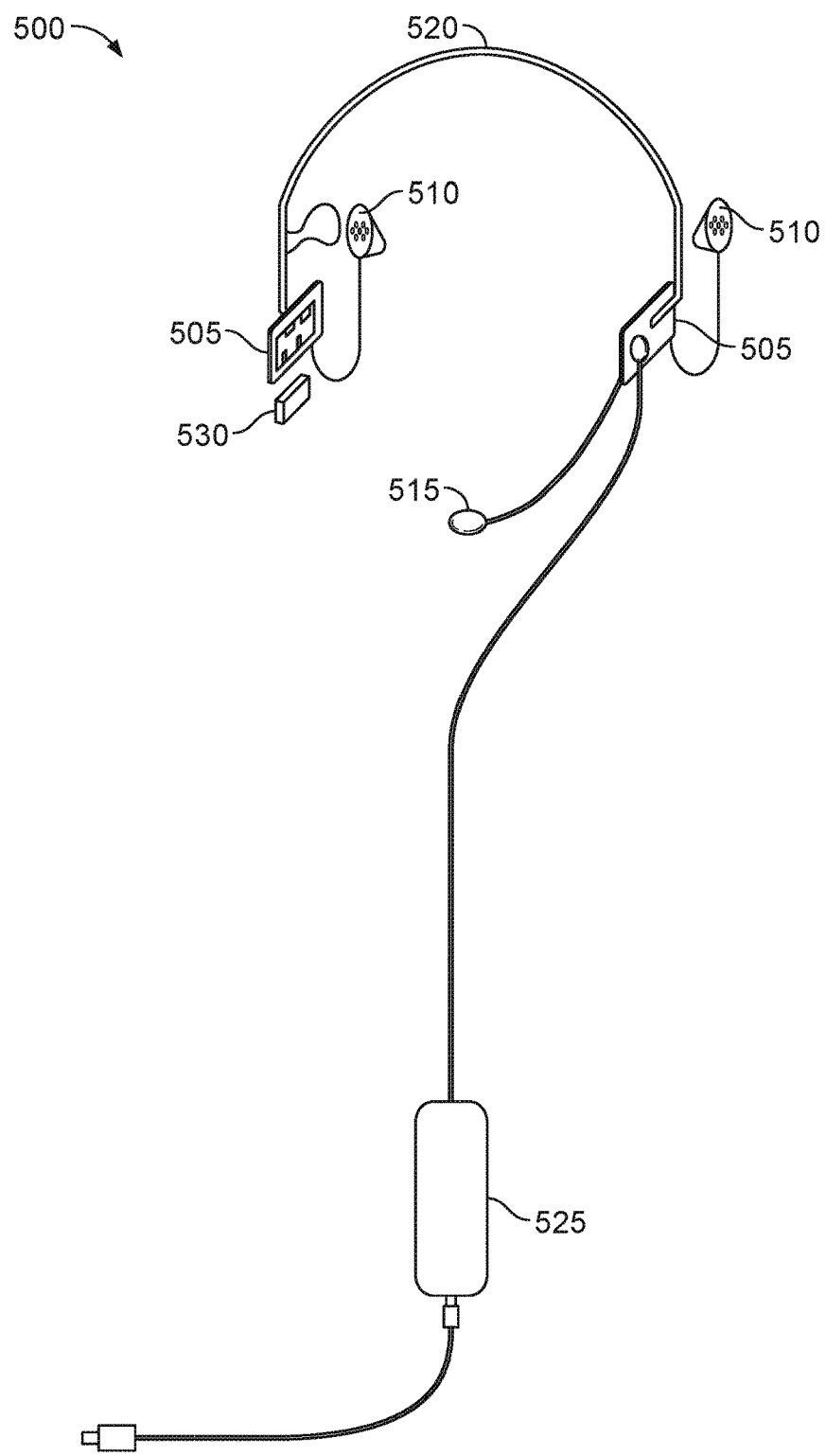
FIG. 5 shows another example implementation of an aviation headset.

In some implementations, an energy storage and selection module 225 and/or a connector module 232 may also be used independently to the portable apparatus 210. FIG. 5 shows an example of an aviation headset 500 that does not employ a portable apparatus. Rather in the headset 500 is directly connected to an energy storage and selection module 525 that includes a receptacle or connection port for receiving various types of connecting cables. For example, the connection port on the energy storage and selection module 525 can be configured to receive a connector module (e.g., the connector module 232 described above) compatible with various types of cables. In some implementations, the cable connected to the connection port can be one of the intercom cables 230 described above. In some implementations, the connection port can be configured to receive a non-intercom cable (e.g., a 3.5 mm cable for connecting to a headphone jack of a phone or other media playing device).

In some implementations, the energy storage and selection module 525 can be substantially similar to the energy storage and selection module 225 described above. In some implementations, additional modules and circuits may be included in the energy storage and selection module 525. For example, one or more modules or circuitry described with respect to the portable apparatus 210 can be disposed within the energy storage and selection module 525. Examples of such modules and circuitry include a controller 305, a user-interface 310, a wireless transceiver 315, a microphone multiplexer 320, and audio circuitry 370, as described above with reference to FIG. 3.

In some implementations, the headset 500 includes support platforms 505 on either side to which acoustic transducers 510 are connected. The support platforms 505 can be physically connected to one another by an over-the-head or around-the-neck bridge structure 520. The support platforms 505 may rest against a user's head (e.g., above, behind and/or in front of a user's ears) when the headset 500 is in use, and may include a temperature management material, such as phase-change material (PCM) for absorbing body heat and/or providing a cooling sensation at the point of contact. An external microphone 515 (e.g., a boom microphone) can be attached (e.g., detachably at a pivot) to one of the support platforms, to the over-the-head or around-the-neck bridge structure 520, or alternatively to a separate over-the-head or around-the-neck support structure (not shown). In some implementations, the support platforms 505 can include at least a portion of the circuitry for the headset 500, for example, in the form of a printed circuit board (PCB). In some implementations, at least one of the support platforms include a termination block 530. The termination block may be used, for example, to complete the audio signal circuit on the ear cup opposite from the down cable. This is described in additional detail in U.S. Pat. No. 8,477,959, the entire content of which is incorporated herein by reference.

In some implementations, the headset 500 can be used in both aviation and non-aviation modes. For example, as described with references to FIGS. 2A-2B, the external microphone 215 may be removed to reduce the overall form factor of the headset, making it more amenable to non-aviation and personal uses. The headset 500 may also include an in-line microphone (similar to in-line microphone 217 of FIGS. 2A-2B) that may be used when the microphone 215 is not connected to the headset 500. The over-the-head or around-the-neck bridge structure 520 can also be configured to be used in both aviation and non-aviation modes. For example, in one implementation, the over-the-head bridge structure 520 is disposed on a user's head when in aviation mode, while being disposed around a user's neck when in non-aviation mode. In non-aviation mode, the microphone 215 may be rotated up towards a user's mouth, or may be removed in lieu of an in-line microphone as described herein.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media or storage device, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

Other embodiments and applications not specifically described herein are also within the scope of the following claims. For example, the level of control on the instability mitigation can be tailored based on various parameters such as probability of detection, and target false positive and/or false negative rates. Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. A portable apparatus comprising:
   a first connection port for connecting the portable apparatus to one or more acoustic transducers;
   a second connection port for receiving a connection to a microphone;

a third connection port for receiving a conductor that connects the portable apparatus to a communication module of an aircraft; and circuitry for interconnecting the first, second, and third connection ports, wherein in a non-aviation mode of operation, the portable apparatus is configured to connect an audio source to the one or more acoustic transducers with the microphone being disconnected from the second connection port.

2. The apparatus of claim 1, wherein the conductor connects the portable apparatus to an energy storage and selection module to which the communication module of the aircraft is connected.

3. The portable apparatus of claim 1, wherein the first connection port is configured to receive a wired connection to the one or more acoustic transducers in a detachable configuration.

4. The portable apparatus of claim 1, wherein the one or more acoustic transducers are disposed in a headset or a set of earphones.

5. The portable apparatus of claim 1, wherein the microphone is a boom microphone that is detachably attached to a headset or a set of earphones and detachably attached to the portable apparatus.

6. The portable apparatus of claim 1, further comprising a noise reduction engine configured to process signals output on the first connection port.

7. The portable apparatus of claim 1, further comprising a wireless transceiver configured to provide a wireless connection between the portable apparatus and an external wireless-enabled device.

8. The portable apparatus of claim 7, wherein the one or more acoustic transducers are disposed in the wireless-enabled device.

9. The portable apparatus of claim 7, wherein the wireless transceiver engine comprises a Bluetooth® module.

10. The portable apparatus of claim 1, configured to be powered by an external power source.

11. The portable apparatus of claim 1, configured to be powered by an internal power source disposed within the apparatus.

12. The portable apparatus of claim 11, further comprising a fourth connection port for charging the internal power source from an external source.

13. The portable apparatus of claim 11, further comprising circuitry to disconnect from the internal power source upon detecting that an external power source is available to power the apparatus.

14. The portable apparatus of claim 1, further comprising one or more processing devices configured to determine an operating state based on detecting which of the first, second, and third connection ports is being used.

15. The portable apparatus of claim 1, further comprising one or more processors configured to determine that the second connection port is disconnected, and responsive to determining that the second connection port is disconnected, enable the first connection port to receive input signals from an in-line microphone connected to the one or more acoustic transducer.

16. An apparatus comprising:
one or more acoustic transducers; and
a connection module connected to the one or more acoustic transducers, the connection module comprising:
a microphone port for detachably receiving a connector to a microphone, and
an external connection port for detachably receiving a conductor providing a connection to a communication module of an aircraft,
wherein in a non-aviation mode of operation, the connection module is configured to connect an audio source to the one or more acoustic transducers with no microphone being connected to the microphone port.

17. The apparatus of claim 16, wherein the conductor connects the connection module to an energy storage and selection module to which the communication module of the aircraft is connected.

18. The apparatus of claim 16, wherein the microphone is a boom microphone.

19. The apparatus of claim 16, further comprising a noise reduction engine configured to process signals output through the one or more acoustic transducers.

20. The apparatus of claim 16, configured to be powered by an external power source.

21. The apparatus of claim 16, configured to be powered by an internal power source disposed within the apparatus.

22. The apparatus of claim 21, further comprising a charging port for charging the internal power source from an external source.

23. The apparatus of claim 21, further comprising circuitry to disconnect from the internal power source upon detecting that an external power source is available to power the apparatus.

24. An apparatus comprising:
a connection module comprising:
a first connection port for connecting the apparatus and one or more acoustic transducers,
a second connection port for detachably receiving a connector to a microphone, and
a third connection port for connecting the apparatus to a communication module of an aircraft,
wherein in a non-aviation mode of operation, the apparatus is configured to connect an audio source to the one or more acoustic transducers with no microphone being connected to the second connection port; and
an electrical connector configured to be detachably attached to the connection module at the third connection port, the electrical connector comprising:
an in-line energy storage and selection module configured to provide at least a portion of operating power to the connection module, and
a multi-pin port configured to receive an adaptor that connects to a cable selectable from multiple cables of different types, wherein the cable couples the electrical connector to the communication module of the aircraft.

25. The apparatus of claim 24, wherein the multiple cables include a group consisting of a single-prong intercom cable, a multi-prong intercom cable, and a LEMO/Redel intercom cable.

26. The apparatus of claim 24, wherein the in-line energy storage and selection module comprises a battery bank.

27. The apparatus of claim 26, wherein the in-line energy storage and selection module comprises circuitry to disconnect the battery bank upon detecting that an external power source is available to power the apparatus.

28. The apparatus of claim 26, wherein the in-line energy storage and selection module comprises a power multiplexer that selects, as a power source for the apparatus, one of: the battery bank or an external power source.

* * * * *